United States Patent [19]

Vanzant

[11] Patent Number: 4,717,054
[45] Date of Patent: Jan. 5, 1988

[54] TIRE CARRIER WITH PIVOTABLE TIRE MOUNT AND VARIABLE COUNTERFORCE DEVICE

[76] Inventor: Teddy L. Vanzant, 3060 Kips Korner, Norco, Calif. 91760

[21] Appl. No.: 821,270

[22] Filed: Jan. 22, 1986

[51] Int. Cl.[4] .................................................. B60R 3/00
[52] U.S. Cl. ................................ 224/42.21; 224/42.06
[58] Field of Search ............... 224/42.12, 42.06, 42.17, 224/42.21, 42.28, 42.08; 414/462–466

[56] References Cited

U.S. PATENT DOCUMENTS

| 3,343,736 | 9/1967 | Sellers | 224/42.06 |
| 3,613,971 | 10/1971 | Betz | 224/42.21 X |
| 4,155,472 | 5/1979 | Dansbury | 414/466 |
| 4,278,191 | 7/1981 | Mecham | 414/466 X |
| 4,484,699 | 11/1984 | Heck | 224/42.21 |
| 4,485,945 | 12/1984 | Ankeny | 414/463 X |

FOREIGN PATENT DOCUMENTS 201925 11/1938 U.S.S.R. ........................ 224/42.21

Primary Examiner—Henry J. Recla
Assistant Examiner—Robert M. Petrik
Attorney, Agent, or Firm—Jackson & Jones

[57] ABSTRACT

A tire carrier adapted with a bumper-mounted hinge plate housing a pivot rod having the lower portion of a generally inverted Ushaped tire mounting frame pivotably attached at the pivot rod is disclosed herein. A lower bracket extends vertically below the pivot rod and includes a pivotable connection point for rotatably housing a lower end of a gas cylinder. The upper end of the gas cylinder is rotatably mounted in an upper bracket which extends horizontally and toward the rear from a forwardly inclined top rail of the tire mounting frame. When in a normal upright position on a vehicle the gas cylinder is positioned vertically in a vertical plane located at the outer edge of a rear bumper of the vehicle. A spare tire to be carried is mounted on pivotably lug bolts which are rotatable about the upper portion of the tire mounting frame. A tire changing tool locks the pivot point of the hinge into an open horizontal position so that the carried spare can be removed from the tire mounting frame. The geometry of the hinge and gas cylinder mounting of this tire carrier invention provides a variable moment arm so that a variable counterforce is developed within the gas cylinder.

26 Claims, 4 Drawing Figures

TIRE CARRIER WITH PIVOTABLE TIRE MOUNT AND VARIABLE COUNTERFORCE DEVICE

BACKGROUND OF THE INVENTION

1. Origin of the Invention

This invention is the result of the inventor's recognition of a long-standing unresolved problem and the realization of means for solving that problem.

2. Field of the Invention

The invention is related to the automobile accessory field, and more particularly to a tire carrier which is adapted with a pivotal tire mount and a variable moment counterforce supplied by a near-vertically oriented gas cylinder which is mounted on the exterior of the vehicle.

3. Brief Description of the Prior Art

Tire carriers utilizing a gas spring to develop a counterforce which aids in a controlled lowering and raising of an exterior-mounted spare tire are known in the art. Most such tire carriers, including the assignee's commercial models prior to this invention, are mounted on a rear bumper. The gas cylinder is positioned horizontally from the bottom of the tire carrier frame, with the other end of the gas cylinder being secured to the vehicle's under-frame.

Prior art mounting of the gas cylinder under the rear section of the vehicle exposes that cylinder to dirt and road grime. Furthermore, the mounting position subjects the gas cylinder to damage from rocks and other uneven road surfaces. In addition, if trailer hitches are employed on the vehicle, the horizontal mounting position creates mounting problems requiring that clearance holes or spaces be provided in the trailer hitch mounting struts.

The prior art tire carriers do not provide any means for swinging and holding the carried tire in a vertical position when the carrier is lowered to a horizontal position. A tire-changing tool and pivotal tire mount is provided in this invention so that the carried spare may be lowered vertically to the roadway, removed and replaced by the flat tire. The tire carrier of this invention requires a minimum of drilling, cutting and reworking for its installation, and features an exterior vertical mounting location for the gas cylinder which provides enhanced protection from road grime and under-carriage damage.

SUMMARY OF THE INVENTION

The tire carrier of this invention is adapted with a bumper-mounted hinge plate housing a pivot rod having the lower portion of a generally inverted U-shaped tire mounting frame pivotably attached at the pivot rod. A lower bracket extends vertically below the pivot rod and includes means for rotatably housing a lower end of a gas cylinder. The upper end of the gas cylinder is rotatably mounted in an upper bracket which extends horizontally and toward the rear from a forwardly inclined top rail of the tire mounting frame. When in a normal upright position on a vehicle the gas cylinder is positioned vertically in a vertical plane located at the outer edge of a rear bumper of the vehicle. A spare tire to be carried is pivotably mounted on lug bolts which are rotatably mounted about the upper portion of the tire mounting frame. As the mounting frame is pivoted downwardly, the lug bolts pivot on the mounting frame so that the carried tire clears away from contact with the gas cylinder.

If a flat tire is to be changed, the lowered spare tire may be pivoted into a vertical position until the spare touches the roadway. A tire changing tool locks the pivot point of the hinge into an open horizontal position so that the carried spare can be removed from the tire mounting frame.

When locked in the open position, the lifting force of the gas cylinder remains stored in the cylinder. After the flat tire has been placed on the lug bolts, the tool is removed and the stored energy in the gas cylinder helps lift the flat tire into an upright carried position. The geometry of the hinge and gas cylinder mounting of this tire carrier invention provides a variable moment arm so that a variable counterforce is developed within the gas cylinder. The lifting moment is greatest when the tire mounting frame is in a lowered horizontal position. That moment progressively decreases until it is at a minimum when the tire carrier frame is in its normal upright and near verticle position. This tire-changing feature is particularly beneficial in that a person of slight build can rely upon the near maximum counterforce to move the tire from full down position back to a vertical upright position without heavy lifting.

BRIEF DESCRIPTION OF THE DRAWING

FIG. 2a is a view showing the variable moment arm of FIGS. 1 or 2.

FIG. 3 is a view showing the tire-changing tool of this invention locked in place.

DETAILED DESCRIPTION OF THE DRAWING

Figure 1:
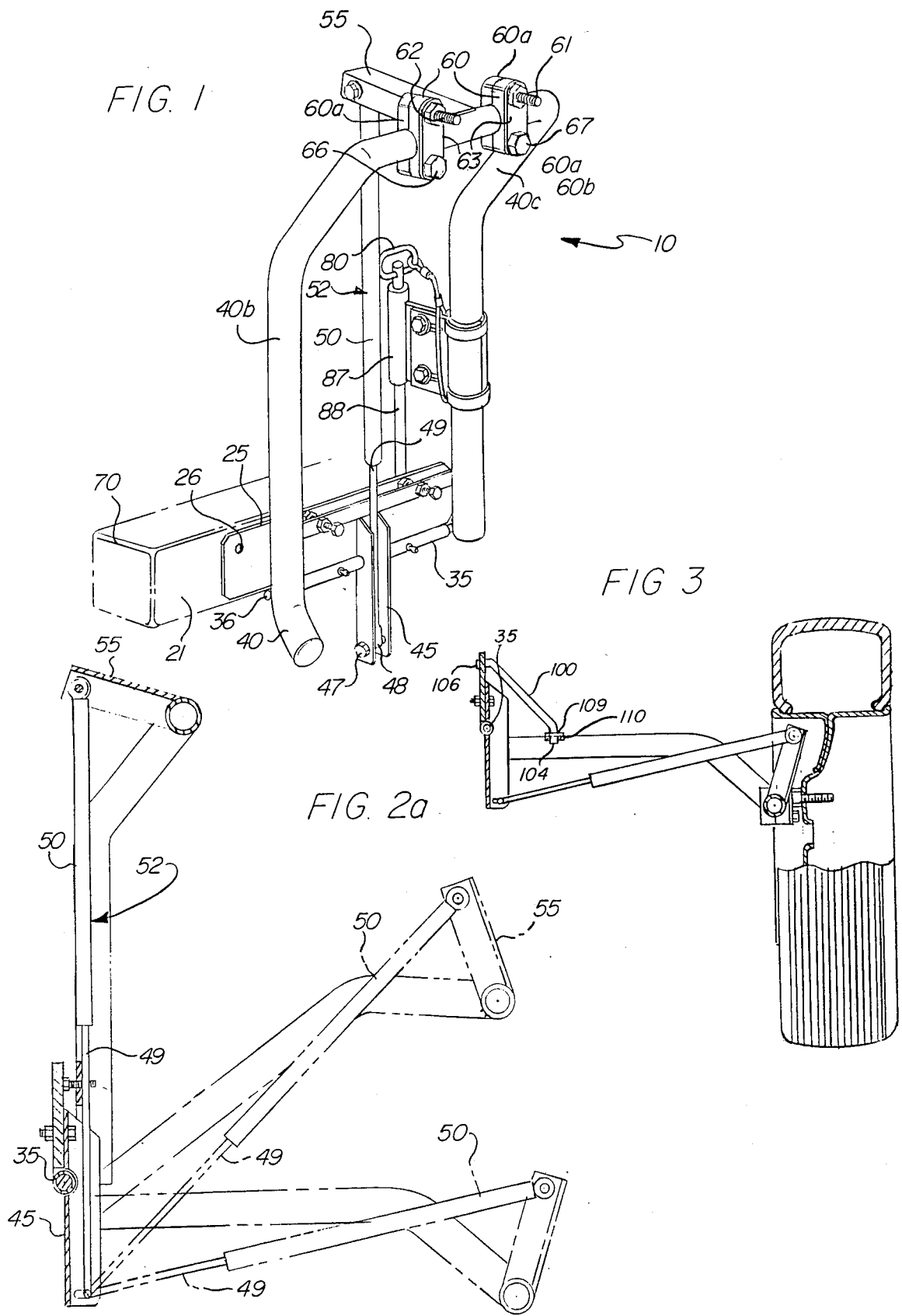
FIG. 1 is a perspective view of the tire carrier of this invention.

A tire carrier 10 of this invention is shown in perspective view in FIG. 1. A vehicle bumper 20 in partial perspective cutaway is shown having a rearward surface 21 adapted to receive a bumper mounting plate 25. Plate 25 is provided with holes 26 for receiving a mounting bolt and nut 30, FIG. 2 which solidly fastens the carrier 10 to the bumper 20.

Figure 2:
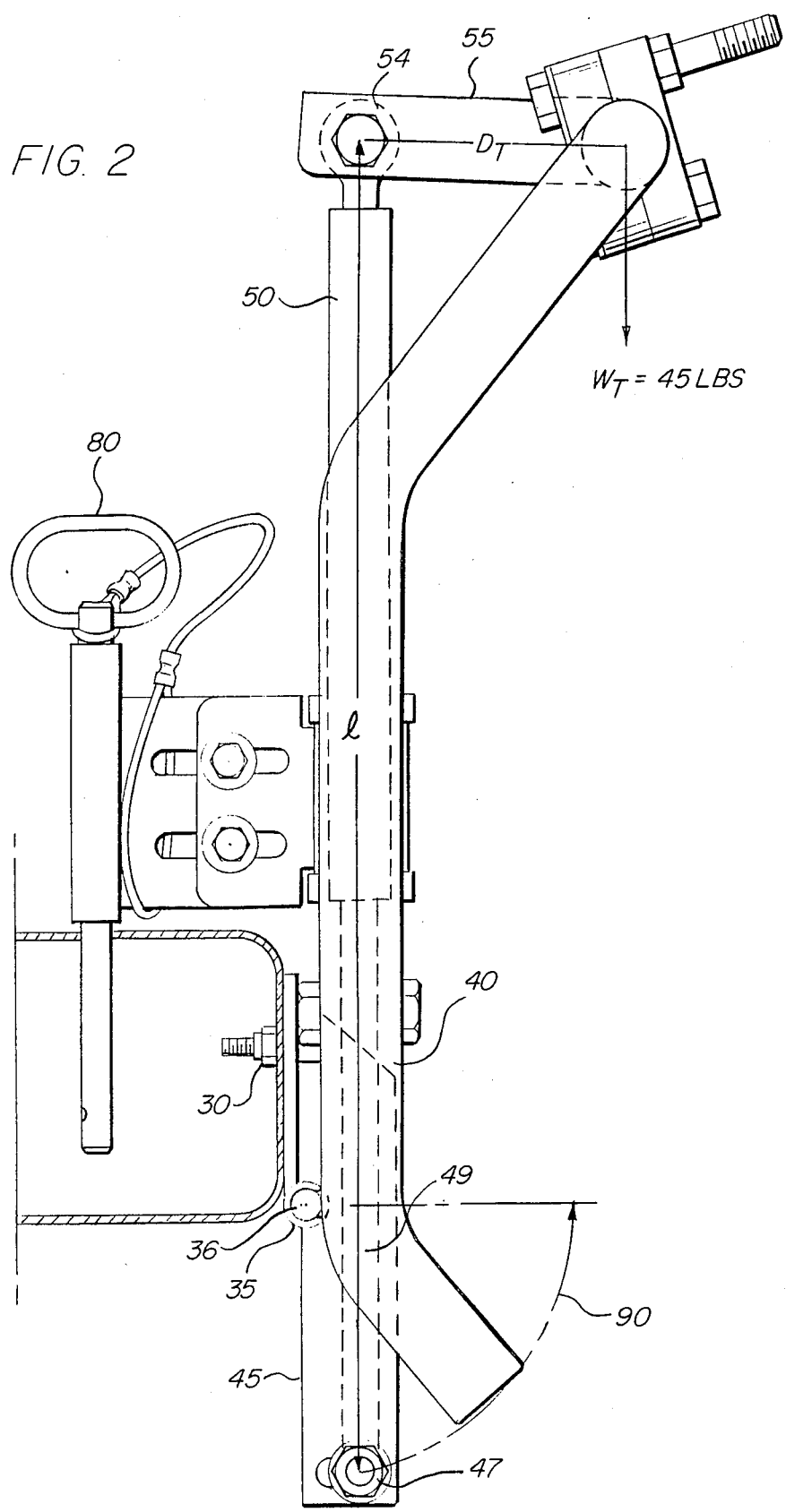
FIG. 2 is a side view of the tire carrier of this invention

As best shown in FIG. 2, a pivot pin sleeve 35 is welded or otherwise formed at the lower bottom edge of bumper plate 25. A pivot rod 36 is fastened as by welding or other wise across the open bottom end of a generally inverted U-shaped tire mounting frame 40. Pivot rod 36, sleeve 35, the bottom of plate 25 and mounting frame 40 form a hinged pivot axis about which the carrier 10 can pivot from a generally vertical and upright position to an open full down position wherein the tire mounting frame 40 is in a generally horizontal position. Grease fittings 28, FIG. 1, allow the hinge to be lubricated as desired.

A U-shaped channel iron extension bracket 45 is welded to the outwardly-facing surface of mounting plate 25. The bottom of bracket 45 acts as a clevis and is provided with a pair of openings for receiving a nut and bolt 47. An eye 48 at one end of a piston rod 49, is rotatably mounted within the clevis at the bottom of U-channel bracket 45.

An outer casing 50 of a known gas cylinder 52 is also adapted with an eye 54, FIG. 2, at the upper end of cylinder 52. A second U-shaped channel iron bracket 55 is welded at one end to the upper horizontal rail 40a of the tire mounting frame 40. The other end of bracket 55 serves as an upper clevis to rotatably receive and house the top eye 54 of casing 50. Upper bracket 55 extends in a horizontal position to the rear and away from an outwardly angled extension of the side rails 40b and 40c of tire mounting frame 40. The angled extension of side frame portions 40b and 40c allows the top rail 40a to fit with an inner recess of a hub holding a spare tire to be carried by the tire carrier 10.

A pair of universal mounting blocks 60 are pivotably secured around the upper ail 40a of mounting frame 40. Each block 60 is formed from a yoke pair 60a, 60b selected from hardened nylon material. The yoke pair 60a and 60b form a slightly oversized circular sleeve when joined together around the cylindrical upper rail 40a of mounting frame 40. When yoke halves 60a and 60b are secured together they snugly but pivotably fit around top rail 40a. Nut and bolts 66 and 67 join the bottom of the yolk halves of each block 60. Top bolts 61, 62 of the mounting blocks 60 have threaded lug extensions which face outwardly from back-up plates 63. These threaded extensions are guided through any two openings of a tire's hub which is to be mounted on carrier 10.

A latch pin 80 with flag mounting plates 85, 86 is used to hold the tire carrier in a normal upright position. The functions of latch pin 80 is to secure the tire in the vertical upright position in spite of acceleration, deceleration, shocks, bumps, etc. Flag plate 86 is secured to side rail 40c and flag plate 85 is welded or otherwise fastened to a housing sleeve 87 which sleeve holds latch pin 80 so that pin 80 can be removably inserted into an opening 88 in bumper 20. Adjustable bolts 29, FIG. 1, are fastened to a crosspiece 110 so that tire mounting frame 40 is in proper position when the stop end of adjustable bolts 29 touches plate 25.

In operation, a gas cylinder 52 of any well-known type is selected for the carrier 10, depending upon the weight of the spare tire to be carried. A normal spare tire and hub may weigh about forty-five pounds. For this weight, a gas cylinder 52 which is precharged to about one thousand pounds per square inch is suitable. Vertical off-pivot mounting of gas cylinder 52 provides a variable counterforce when it is operated in a tire lowering and raising operation.

In this invention, an "off-hinge" or "off-pivot" counter force is developed because the force point between the opposed ends of cylinder 52 is not located at the axis of the pivot pin itself. In the vertical upright position the pre-loaded force of gas cylinder 52 has a very small moment arm which is shown in FIG. 2 as $V_m$. $V_m$ is essentially one-half of the width of the piston connecting rod 49. In FIG. 2 the downward force of the tire and hub, about 45 pounds, is shown at $W_T$. In the vertical upright position, the distance from the midpoint of eye 54 to eye 48 is designated as "1". In a simplified moment and force diagram, that weight times the distance, $D_T$, is opposed by the upward force of the gas cylinder 52 along force line "1" times the small moment arm $V_m$. For the example given, the gas cylinder pressure of 1,000 lbs. per square inch is sufficient to hold the tire in a vertically upright position.

As the tire weight $W_T$ is moved downward and away from the vehicle, the lower connection point of connecting rod 49 at the center of bolt 47 remains fixed as shown in FIG. 2. The gas inside cylinder housing 50 is progressively compressed and the distance of 1 decreases, as the piston connecting rod 49 moves further into housing 50 as the carrier is lowered. For example, the total distance 1 is about nineteen and one-half inches when the carrier 10 is in a vertical upright position. When the tire has swung downwardly to about 45 degrees, FIG. 2a, the total length has decreased to about seventeen inches and the compression within the gas cylinder 52 has increased to an estimated 1,500 lbs. per square inch. When the tire carrier mounting frame 40 is full down and essentially horizontal the length has decreased to about fifteen inches and the estimated compression within cylinder 52 is about 2,000 lbs. per square inch.

As the above-noted shortening occurs, the moment arm progressively increases until, in the horizontal position, the moment arm is the length of bracket 45 measured from the center of pivot pin 35 to the middle of bolt 47. Although simplified and not drawn to scale, the drawing of FIG. 2a depicts the variable counterforce created by the off-pivot feature of this invention.

Nylon blocks 60 allow the tire itself to pivot about the top of rail 40a when lowered or when it is necessary to change a flat tire. As shown in FIG. 3, the carried tire can be tilted into a vertical position so that its bottom is resting on the surface of the roadway. For this feature it is essential that the pivot-locking tire changing tool 100 first be inserted into a locked position between the bottom crosspiece 110 and the bumper mounting plate 25. A hole 106 in mounting plate 25 receives one end of tool 100 and the other end of tool 100 is inserted into another opening 104 in cross piece 110. The crosspiece end of tool 100 has a backing washer or collar 109 welded or otherwise fastened near its free end. The lower surface of collar 109 and crosspiece 110 engage each other and the tire mounting frame 40 is wedged into an open horizontal position. Once the tire-retaining lugs have been removed the spare tire can be rolled away and the flat tire can take its place on the lug bolts 61, 62. After the flat is firmly secured in place the tire-changing tool 100 can be removed and the gas cylinder 52 will exert its counterforce to lift the flat into a vertical upright position. The need for a slightly built person to lift either the flat or spare tire has been essentially eliminated by the novel features of this tire carrier invention.

Ground level removal and replacing does warrant a caution. The tire-changing tool or other suitable downward weight or force must be applied to frame 40 before the carried tire is removed. Otherwise, the free cylinder 52 will cause the unweighted frame 40 to fly back to its upright position.

The above description presents the best mode contemplated of carrying out the present invention. This invention is, however, susceptible to modifications and alternate constructions from the embodiment shown in the drawing and described above. Consequently, it is not the intention to limit this invention to the particular embodiment disclosed. On the contrary, the invention is to cover all modifications falling within the spirit and scope of the invention as expressed in the claims.

What is claimed is:

1. A normally vertically-located upright tire carrier of the type adapted to manually swing downwardly and away from a vehicle and having a counterforce applying device and a hinged support plate with a horizontal pivot axis for pivotably securing the carrier to the vehicle, said carrier comprising:
    an upright tire carrier frame located in a near vertical plane and pivotably connected at said pivot axis on said hinged support plate;

a vertically-oriented counterforce device arranged to pivot from a near vertical position when said carrier frame is upright to a near horizontal position when said carrier frame is lowered;

means fastening an upper end of said counterforce device at an upper location of said frame;

means fastening the lower end of said counterforce device at an off-pivot location lying in a near vertical plane and positioned below said pivot axis of said hinged support plate; and said off-pivot location and connection of said counterforce device providing a means for producing a variably increasing counterforce as said tire carrier frame is swung downwardly and away from said normally upright vertical location.

2. A tire carrier as defined in claim 1 wherein
said counterforce device is a gas cylinder having a preloaded force which is subjected to increased compression as said tire carrier frame is pivoted downwardly from said normally upright position.

3. A tire carrier as defined in claim 2 wherein said gas cylinder comprises a sealed gas-loaded outer casing and a piston compression rod located within the sealed housing and wherein
said piston rod and said outer casing are connected between said upper end and said lower end fastening means for said counterforce device.

4. A tire carrier as defined in claim 3 wherein
said gas cylinder is in close proximity to said piston axis to provide a small moment arm for the counterforce supplied by said cylinder when said mounting frame is in said vertical upright position.

5. A tire carrier as defined in claim 4 wherein
said lower end fastening means is a rigid member fastened to said support plate and extending below said pivot axis.

6. A tire carrier as defined in claim 5 wherein
said rigid member is a U-shaped channel allowing said gas cylinder to lie within said channel.

7. A tire carrier in accordance with claim 4 wherein said upper-end fastening means is a substantially horizontally located rigid member extending away from the top of said tire mounting frame.

8. A tire carrier in accordance with claim 4 wherein the top portion of said tire mounting frame is angled outward away from said vehicle to receive an inner recess of a tire hub to be mounted on said carrier.

9. A tire carrier in accordance with claim 8 wherein said upper-end fastening means extends from said vertical plane to the angled top rail of said mounting frame.

10. A tire carrier in accordance with claim 5 wherein said lower-end fastening means is of a selected length to provide a maximum moment arm for the counterforce supplied by said cylinder when said mounting frame is in a full down and substantially horizontal position.

11. A tire carrier in accordance with claim 3 wherein said top portion of said mounting frame includes tire mounting lug bolts to receive a hub of a tire to be mounted thereon.

12. A tire carrier in accordance with claim 11 wherein
said tire mounting lug bolts include means for pivotably swinging the bottom of said mounted tire away from said frame as said frame is pivotably swung downwardly from said vertical position.

13. A tire carrier in accordance with claim 12 wherein said carrier additionally comprises
means for holding said carrier frame in a full down position if the carried tire is to be removed.

14. A tire carrier in accordance with claim 13 wherein
said holding means is a rigid member positioned between the hinge support plate and said mounting frame.

15. A tire carrier in accordance with claim 12 wherein
said top rail of said tire mounting frame is circular and said mounting lug bolts are formed in snug but slightly oversized circular openings in yokes which carry said lug bolts.

16. A normally upright tire carrier of the type adapted to swing downwardly and away from a near vertical plane at the rear of a vehicle and having a counterforce applying device and a hinged support plate with a pivot axis for pivotably securing the carrier to the vehicle, said carrier comprising:

an upright tire carrier frame pivotably connected at said pivot axis on said hinged support plate;

a vertically-oriented counterforce device arranged to pivot from a near vertical position when said carrier frame is upright to a near horizontal position when said carrier frame is lowered;

means fastening an upper end of said counterforce device at an upper location of said frame; and means fastening the lower end of said counterforce device to said support plate and at an off-pivot location relative to said pivot axis of said hinged support plate.

17. A tire carrier as defined in claim 16 wherein
said counterforce device is a gas cylinder having a preloaded force which is subjected to increased compression and thus counterforce as said tire carrier frame is pivoted downwardly from said normally upright position.

18. A tire carrier in accordance with claim 17 wherein
the top portion of said tire mounting frame is angled outward away from said vehicle to receive an inner recess of a tire hub to be mounted on said carrier.

19. A tire carrier in accordance with claim 16 wherein
said top portion of said mounting frame includes tire mounting lug bolts to receive a hub of a tire to be mounted thereon.

20. A tire carrier in accordance with claim 19 wherein
said tire mounting lug bolts include rotatable means for pivotably swinging the bottom of said mounted tire away from said frame as said frame is pivotably swung downwardly from said vertical position.

21. A tire carrier in accordance with claim 20 wherein said carrier additionally comprises
means for holding said carrier frame in a full down position if the carried tire is to be removed.

22. A tire carrier in accordance with claim 21 wherein
said holding means is a rigid member positioned between the hinge support plate and said mounting frame.

23. A tire carrier in accordance with claim 16 and further wherein:
said lower-end-fastening means is positioned below said pivot axis.

24. A tire carrier in accordance with claim 16 and further wherein:

said carrier moves in an arc with a fixed radius as it moves from said near vertical to said near horizontal position.

25. A tire carrier in accordance with claim 16 and further wherein:

said counterforce device exhibits a variable amount of counterforce which assists in moving a tire from said near horizontal position to said near vertical position.

26. A tire carrier in accordance with claim 25 and further wherein:

said lower-end-fastening means is positioned below said pivot axis; and said counterforce device provides a variable movement arm relative to said lower-end-fastening means as said tire is moved from a near vertical to a near horizontal position.

* * * * *